US009932975B2

(12) United States Patent
Bhakta et al.

(10) Patent No.: US 9,932,975 B2
(45) Date of Patent: Apr. 3, 2018

(54) COMPRESSOR (71) Applicant: General Electric Company, Schenectady, NY (US)

(72) Inventors: Aditya Bhakta, Bangalore (IN); Bhaskar Tamma, Bangalore (IN)

(73) Assignee: Haier US Appliance Solutions, Inc., Wilmington, DE (US)

( * ) Notice: Subject to any disclaimer, the term of this patent is extended or adjusted under 35 U.S.C. 154(b) by 470 days.

(21) Appl. No.: 14/598,259

(22) Filed: Jan. 16, 2015

(65) Prior Publication Data
US 2016/0208790 A1 Jul. 21, 2016

(51) Int. Cl.
| | |
|---|---|
| *F04B 35/04* | (2006.01) |
| *F04B 39/12* | (2006.01) |
| *F04B 39/00* | (2006.01) |
| *F04B 39/10* | (2006.01) |
| *F16C 32/06* | (2006.01) |
| *F04B 53/00* | (2006.01) |

(52) U.S. Cl.
CPC ............ *F04B 35/045* (2013.01); *F04B 35/04* (2013.01); *F04B 39/0005* (2013.01); *F04B 39/10* (2013.01); *F04B 39/121* (2013.01); *F04B 39/1073* (2013.01); *F04B 39/123* (2013.01); *F04B 53/008* (2013.01); *F16C 32/0622* (2013.01); *F25B 2309/001* (2013.01); *F25B 2400/073* (2013.01)

(58) Field of Classification Search
CPC .. F04B 35/045; F04B 39/123; F04B 39/0016; F04B 53/08; F04B 53/008; F25B 31/002; F25B 31/006

USPC .................... 92/86.5, 127, DIG. 2
See application file for complete search history.

(56) References Cited

U.S. PATENT DOCUMENTS

| | | | | |
|---|---|---|---|---|
| 5,356,225 | A * | 10/1994 | Hanes ................. | F16C 29/025 384/100 |
| 6,016,738 | A * | 1/2000 | Elferink ................ | F04B 39/00 92/127 |
| 6,379,125 | B1 * | 4/2002 | Tojo ...................... | F04B 35/045 417/417 |
| 7,247,007 | B2 | 7/2007 | Roke et al. | |
| 7,415,829 | B2 * | 8/2008 | Rolff ...................... | F04B 7/04 417/53 |
| 7,913,613 | B2 * | 3/2011 | Muth ................... | F04B 35/045 92/169.1 |
| 8,028,409 | B2 * | 10/2011 | Hanes ................. | F04B 35/045 29/446 |
| 9,234,480 | B2 * | 1/2016 | Gayton ................. | F02G 1/055 |
| 2009/0301293 | A1 * | 12/2009 | Bechtold ............. | F04B 35/045 92/127 |
| 2013/0058816 | A1 | 3/2013 | Kim | |
| 2015/0078925 | A1 * | 3/2015 | Choi ................... | F04B 35/045 417/228 |

* cited by examiner

*Primary Examiner* — Thomas E Lazo
*Assistant Examiner* — Michael Quandt
(74) *Attorney, Agent, or Firm* — Dority & Manning, P.A.

(57) ABSTRACT

A compressor includes a plurality of gas bearing conduits and a plurality of gas bearing control valves. Each gas bearing control valve of the plurality of gas bearing control valves is coupled to a respective one of the plurality of gas bearing conduits. The gas bearing control valves are configured for permitting fluid flow through the gas bearing conduits when a piston of the compressor is positioned adjacent the gas bearing conduits in a chamber of the compressor.

8 Claims, 9 Drawing Sheets

COMPRESSOR

FIELD OF THE INVENTION

The present subject matter relates generally to compressors, such as linear compressors for refrigerator appliances.

BACKGROUND OF THE INVENTION

Refrigerator appliances generally include a compressor. During operation of the refrigerator appliance, the compressor operates to provide compressed refrigerant. The refrigerator appliance utilizes such compressed refrigerant to cool a compartment of the appliance and food items located therein.

Recently, linear compressors have been used to compress refrigerant in refrigerator appliances. Linear compressors can include a piston and a driving coil. The driving coil receives a current in order to generate a force that slides the piston backward and forwards within a chamber to compress refrigerant. Friction between the piston and other components of the linear compressor can negatively affect performance of the linear compressor.

To reduce friction between the piston and other components of the linear compressor, a lubricant is often provided at an interface between the piston and a casing of the linear compressor. Frequently, an oil lubricant is utilized. However, misalignment of the piston within the chamber can interrupt an oil film between the piston and the casing and thus increase friction forces between the components.

Accordingly, a compressor with features for lubricating an interface between a piston of the compressor and a casing of the compressor would be useful. In particular, a compressor with features for lubricating an interface between a piston of the compressor and a casing of the compressor without utilizing an oil lubricant would be useful.

BRIEF DESCRIPTION OF THE INVENTION

The present subject matter provides a compressor. The compressor includes a plurality of gas bearing conduits and a plurality of gas bearing control valves. Each gas bearing control valve of the plurality of gas bearing control valves is coupled to a respective one of the plurality of gas bearing conduits. The gas bearing control valves are configured for permitting fluid flow through the gas bearing conduits when a piston of the compressor is positioned adjacent the gas bearing conduits in a chamber of the compressor. Additional aspects and advantages of the invention will be set forth in part in the following description, or may be apparent from the description, or may be learned through practice of the invention.

In a first exemplary embodiment, a compressor that defines an axial direction is provided. The compressor includes a casing that defines a chamber that extends along the axial direction. The casing also defines a plurality of gas bearing conduits. Each gas bearing conduit of the plurality of gas bearing conduits has an exit positioned at the chamber of the casing. The exits of the plurality of gas bearing conduits are distributed along the axial direction. A piston is slidably received within the chamber of the casing. A motor is configured for selectively reciprocating the piston along the axial direction within the chamber of the casing. A plurality of gas bearing control valves is configured for regulating fluid flow through the plurality of gas bearing conduits. Each gas bearing control valve of the plurality of gas bearing control valves is coupled to a respective one of the plurality of gas bearing conduits. Each gas bearing control valve of the plurality of gas bearing control valves is configured for permitting fluid flow through the respective one of the plurality of gas bearing conduits when the piston is positioned adjacent the exit of the respective one of the plurality of gas bearing conduits in the chamber of the casing.

In a second exemplary embodiment, a compressor that defines an axial direction is provided. The compressor includes a casing that defines a chamber that extends along the axial direction. The casing also defines a plurality of gas bearing conduits. Each gas bearing conduit of the plurality of gas bearing conduits has an exit, the exits of the plurality of gas bearing conduits distributed along the axial direction. A piston has a piston head slidably received within the chamber of the casing. The piston also has a piston base. The piston head defines a plurality of gas bearing outlets, and the piston base defines a plurality of gas bearing inlets. A motor is configured for selectively reciprocating the piston head along the axial direction within the chamber of the casing. A plurality of gas bearing control valves is configured for regulating fluid flow through the plurality of gas bearing conduits. Each gas bearing control valve of the plurality of gas bearing control valves is coupled to a respective one of the plurality of gas bearing conduits. Each gas bearing control valve of the plurality of gas bearing control valves is configured for permitting fluid flow through the respective one of the plurality of gas bearing conduits when one of the plurality of gas bearing inlets of the piston base is positioned adjacent the exit of the respective one of the plurality of gas bearing conduits.

In a third exemplary embodiment, a compressor that defines an axial direction is provided. The compressor includes a casing that defines a chamber that extends along the axial direction. A piston has a piston head slidably received within the chamber of the casing. The piston also has a piston base. The piston head defines a plurality of gas bearing outlets, and the piston base defines a gas bearing inlet. The gas bearing outlets of the plurality of gas bearing outlets are distributed along the axial direction on the piston head. The piston also defines a conduit that extends between the gas bearing inlet of the piston base and the plurality of gas bearing outlets of the piston head. A secondary casing defines a secondary chamber. The piston base is slidably received within the secondary chamber of the secondary casing. The gas bearing inlet of the piston base is positioned at the secondary chamber of the secondary casing. A motor is configured for selectively reciprocating the piston head along the axial direction within the chamber of the casing and for selectively reciprocating the piston base along the axial direction within the secondary chamber of the secondary casing. A return conduit extends to the secondary chamber of the secondary casing. The return conduit is configured for directing fluid from a gap between the piston head and the casing to the secondary chamber of the secondary casing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
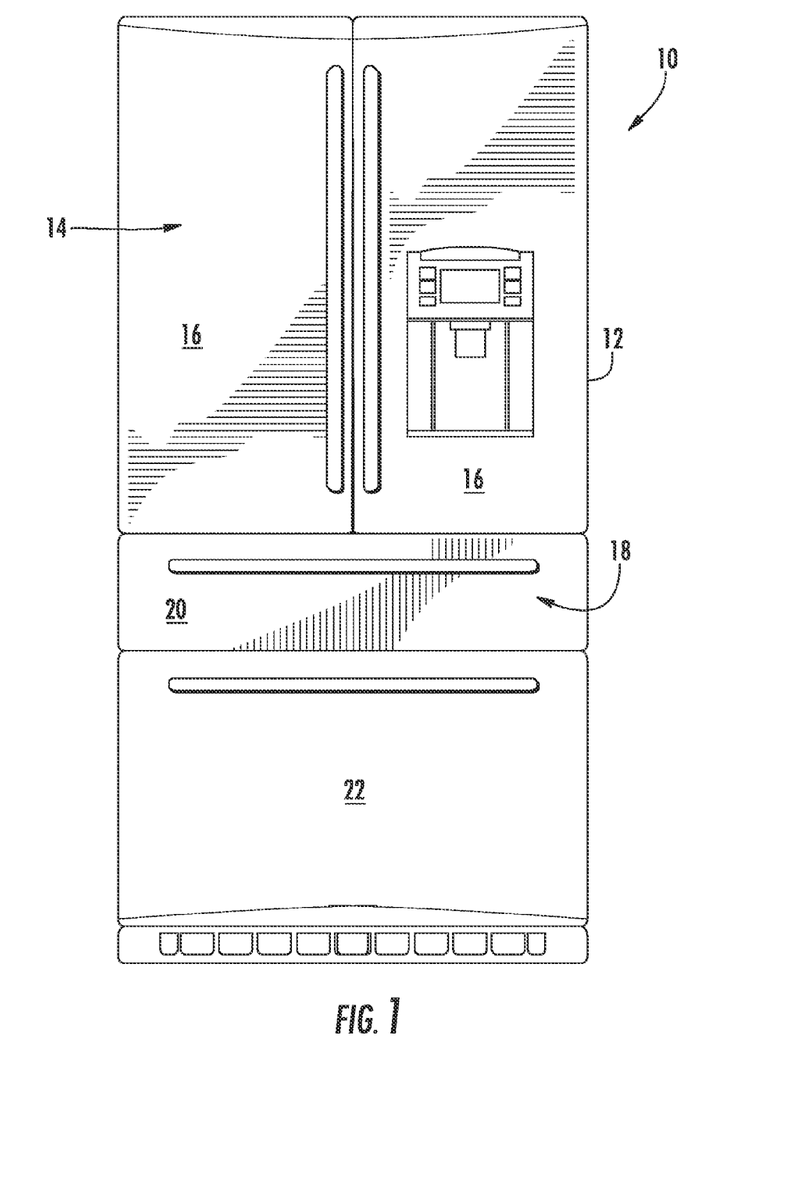
FIG. 1 is a front view of a refrigerator appliance according to an exemplary embodiment of the present subject matter.
Figure 2:
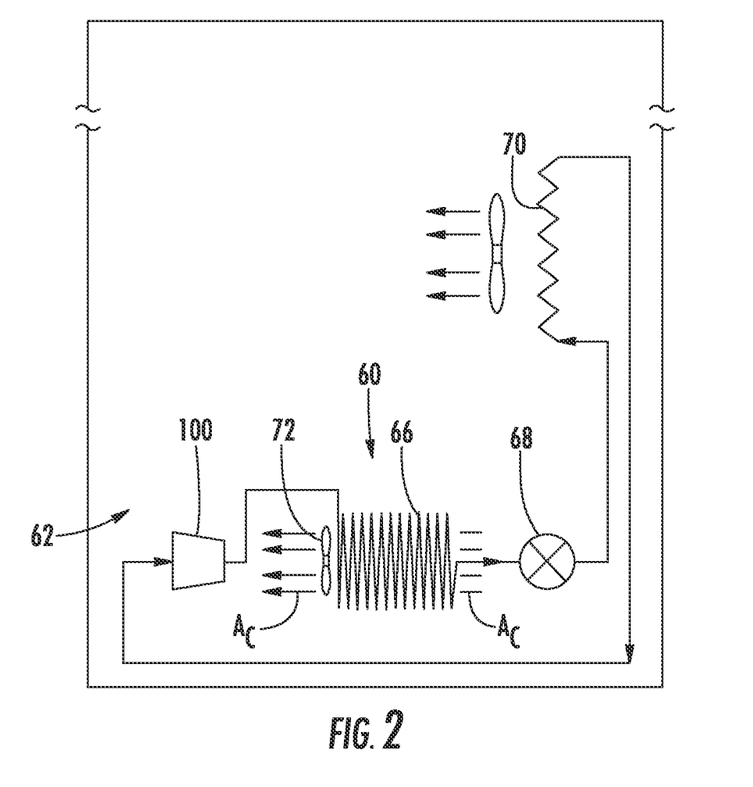
FIG. 2 is schematic view of a refrigeration system of the exemplary refrigerator appliance of FIG. 1.

FIG. 1 depicts a refrigerator appliance 10 that incorporates a sealed refrigeration system 60 (FIG. 2). It should be appreciated that the term "refrigerator appliance" is used in a generic sense herein to encompass any manner of refrigeration appliance, such as a freezer, refrigerator/freezer combination, and any style or model of conventional refrigerator. In addition, it should be understood that the present subject matter is not limited to use in appliances. Thus, the present subject matter may be used for any other suitable purpose such as vapor compression within air conditioning units or air compression within air compressors.

In the illustrated exemplary embodiment shown in FIG. 1, the refrigerator appliance 10 is depicted as an upright refrigerator having a cabinet or casing 12 that defines a number of internal storage compartments. In particular, refrigerator appliance 10 includes upper fresh-food compartments 14 having doors 16 and lower freezer compartment 18 having upper drawer 20 and lower drawer 22. The drawers 20, 22 may be "pull-out" drawers in that they can be manually moved into and out of the freezer compartment 18 on suitable slide mechanisms.

FIG. 2 is a schematic view of refrigerator appliance 10 including an exemplary sealed refrigeration system 60. A machinery compartment 62 contains components for executing a known vapor compression cycle for cooling air within refrigerator appliance 10. The components include a linear compressor 100, a condenser 66, an expansion device 68, and an evaporator 70 connected in series and charged with a refrigerant. Linear compressor 100 is discussed in greater detail below. As will be understood by those skilled in the art, refrigeration system 60 may include additional components, e.g., at least one additional evaporator, compressor, expansion device, and/or condenser. As an example, refrigeration system 60 may include two evaporators.

Within refrigeration system 60, gaseous refrigerant flows into linear compressor 100, which operates to increase the pressure of the refrigerant. This compression of the refrigerant raises its temperature, which is lowered by passing the gaseous refrigerant through condenser 66. Within condenser 66, heat exchange with ambient air takes place so as to cool the refrigerant and cause the refrigerant to condense to a liquid state. A fan 72 is used to pull air across condenser 66, as illustrated by arrows $A_C$, so as to provide forced convection for a more rapid and efficient heat exchange between the refrigerant within condenser 66 and the ambient air. Thus, as will be understood by those skilled in the art, increasing air flow across condenser 66 can, e.g., increase the efficiency of condenser 66 by improving cooling of the refrigerant contained therein.

An expansion device (e.g., a valve, capillary tube, or other restriction device) 68 receives liquid refrigerant from condenser 66. From expansion device 68, the liquid refrigerant enters evaporator 70. Upon exiting expansion device 68 and entering evaporator 70, the liquid refrigerant drops in pressure and temperature. Due to the pressure drop and phase change of the refrigerant, evaporator 70 is cool relative to compartments 14, 18 of refrigerator appliance 10. As such, cooled air is produced and refrigerates compartments 14, 18 of refrigerator appliance 10. Thus, evaporator 70 is a type of heat exchanger which transfers heat from air passing over evaporator 70 to refrigerant flowing through evaporator 70.

Collectively, the vapor compression cycle components in a refrigeration circuit, associated fans, and associated compartments are sometimes referred to as a sealed refrigeration system operable to force cold air through refrigeration compartments 14, 18 (FIG. 1). The refrigeration system 60 depicted in FIG. 2 is provided by way of example only. Thus, it is within the scope of the present subject matter for other configurations of the refrigeration system to be used as well.

Figure 3:
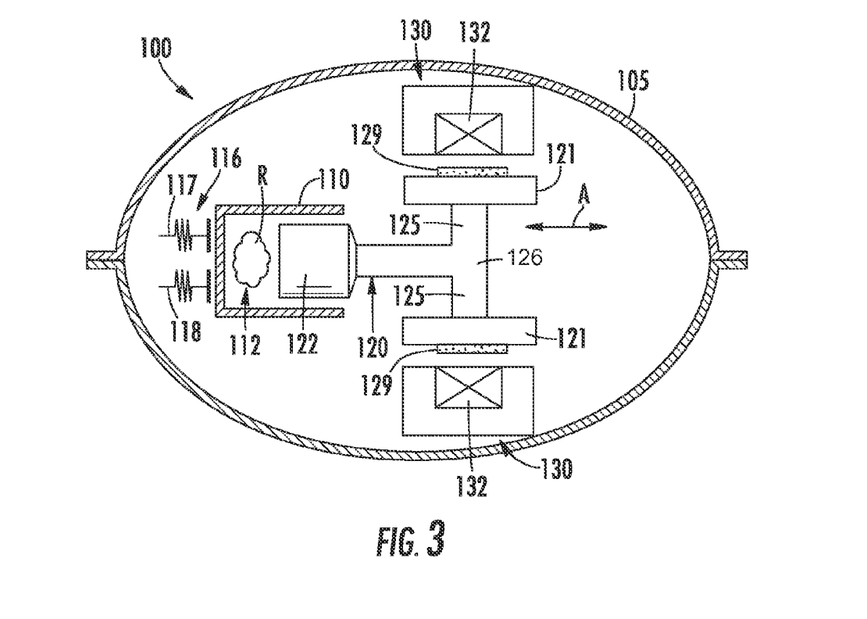
FIG. 3 is a schematic view of a linear compressor according to an exemplary embodiment of the present subject matter.

FIG. 3 is a schematic view of linear compressor 100 according to an exemplary embodiment of the present subject matter. As may be seen in FIG. 3, linear compressor 100 is enclosed in a hermetic or air-tight shell 105. Hermetic shell 105 can, e.g., hinder or prevent refrigerant from leaking or escaping from refrigeration system 60 (FIG. 2) at linear compressor 100.

Linear compressor 100 includes a casing 110 and also defines an axial direction A. Casing 110 defines a chamber 112 that extends longitudinally along the axial direction A. Casing 110 further includes valves 116 that permit refrigerant (shown as R) to enter and exit chamber 112 during compression of refrigerant R by linear compressor 100.

A piston assembly 120 with a piston head 122 is slidably received within chamber 112 of casing 110. In particular, piston head 122 is slidable along the axial direction within chamber 112. During sliding of piston head 122 within chamber 112, piston head 122 compresses refrigerant R within chamber 112. Piston head 122 can slide between a default position, a top dead center position, and a bottom dead center position within chamber 112 as will be understood by those skilled in the art.

As an example, from the top dead center position, piston head 122 can slide within chamber 112 towards the bottom dead center position along the axial direction, i.e., an expansion stroke of piston head 122. During the expansion stroke of piston head 122, an intake/suction valve 117 of valves 116 permits refrigerant R to enter chamber 112 through intake/suction valve 117. When piston head 122 reaches the bottom dead center position, piston head 122 changes direction and slides in chamber 112 back towards the top dead center position, i.e., a compression stroke of piston head 122. During the compression stroke of piston head 122, refrigerant R that enters chamber 112 during the expansion stroke is compressed until refrigerant R reaches a particular pressure and such compressed refrigerant R at a higher pressure and temperature exits chamber 112 through a discharge valve 118 of valves 116. In such a manner, refrigerant R is compressed within chamber 112 by piston head 122.

Piston assembly 120 also includes a flange 121. Flange 121 is radially spaced apart from a shaft 126 and may also extend circumferentially about shaft 126, as will be understood by those skilled in the art. Brackets 125 extend between and connect flange 121 and shaft 126. At least one driving magnet 129, e.g., one, two, three, or more driving magnets, is mounted to flange 121. Driving magnet 129 may extend circumferentially about shaft 126 on flanges 121.

Linear compressor 100 further includes a motor 130 with at least one driving coil 132. Driving coil 132 is positioned proximate flange 121 of piston assembly 120. Driving coil 132 is configured for selectively urging piston head 122 to slide along the axial direction A within chamber 112. In particular, driving coil 132 receives a current from a current source (not shown) in order to generate a magnetic field that engages driving magnet 129 and urges piston assembly 120 to move along the axial direction A in order to compress refrigerant R within chamber 112, as will be understood by those skilled in the art. In particular, driving coil 132 can slide piston assembly 120 between the top dead center position and the bottom dead center position.

Figure 4:
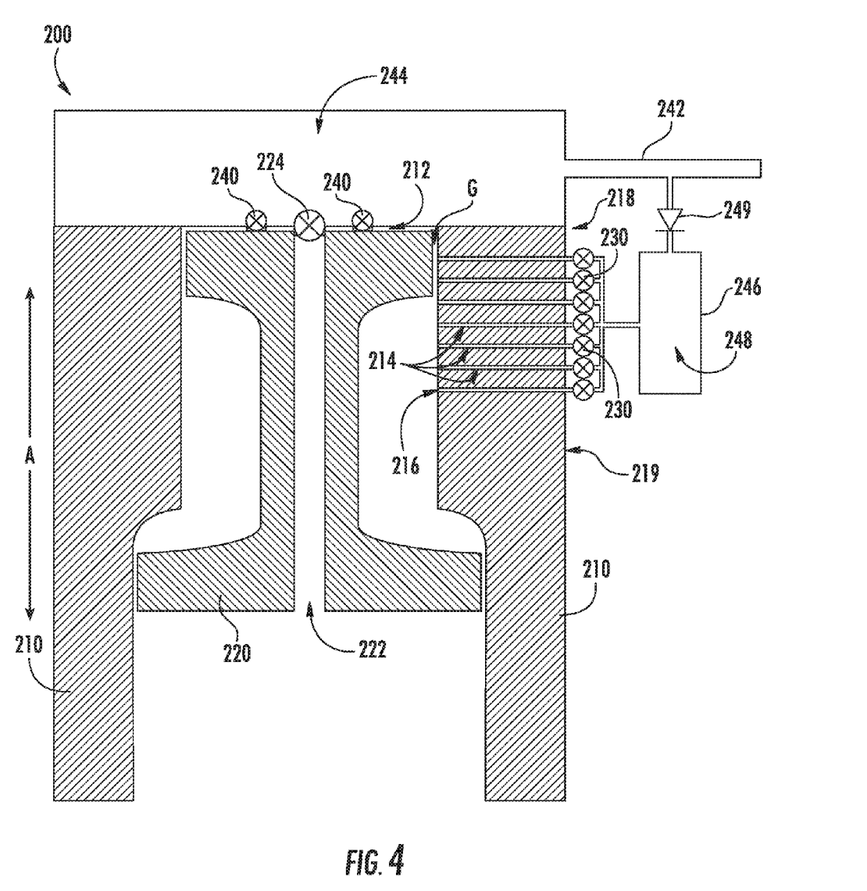
FIGS. 4 and 5 provide schematic views of a gas bearing assembly according to an exemplary embodiment of the present subject matter with a piston shown in various positions.
Figure 5:
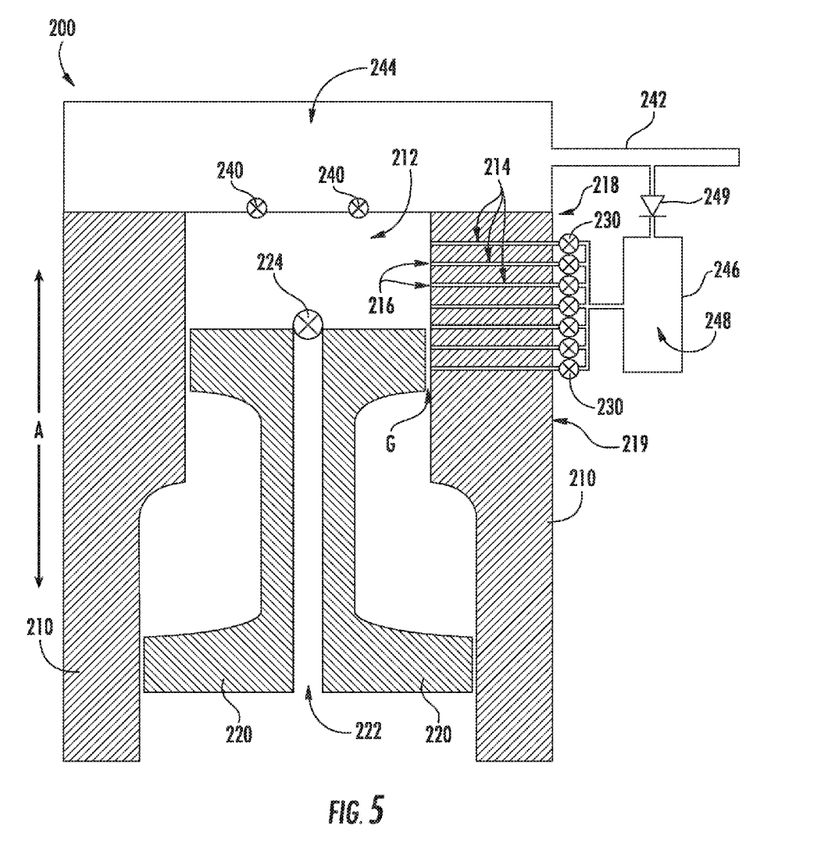

FIGS. 4 and 5 provide schematic views of a gas bearing assembly 200 according to an exemplary embodiment of the present subject matter with a piston 220 shown in various positions. Gas bearing assembly 200 may be used in any suitable compressor. For example, gas bearing assembly 200 may be used in linear compressor 100 (FIG. 3). Thus, gas bearing assembly 200 is discussed in greater detail below in the context of linear compressor 100. As another example, gas bearing assembly 200 may be used with the linear compressor described in U.S. patent application Ser. No. 14/176,996 of Barito et al., which is incorporated in its entirety herein for all purposes, or in a reciprocating compressor with a crankshaft.

As discussed in greater detail below, gas bearing assembly 200 may assist with lubricating movement of piston head 122 within chamber 112 of casing 110. Gas bearing assembly 200 may also assist with centering piston assembly 120 within chamber 112 of casing 110, e.g., while operating in a hydrodynamic lubrication regime with very low friction loss. Gas bearing assembly 200 defines an axial direction A.

As may be seen in FIGS. 4 and 5, gas bearing assembly 200 includes a casing 210. Casing 210 defines a chamber 212 that extends along the axial direction A. Casing 210 also defines a plurality of gas bearing conduits 214. Each gas bearing conduit of gas bearing conduits 214 has an exit 216 that is positioned at chamber 212 of casing 210. Exits 216 of gas bearing conduits 214 are distributed or dispersed, e.g., linearly, along the axial direction A. While not shown in FIGS. 4 and 5, gas bearing conduits 214 may also be extend circumferentially about chamber 212 of casing 210.

Each exit 216 of gas bearing conduits 214 may have any suitable size. For example, each exit 216 of gas bearing conduits 214 may be uniformly sized, or each exit 216 of gas bearing conduits 214 may have a different size. In particular, casing 210 extends between a first axial portion 218 and a second axial portion 219, e.g., along the axial direction A. Exits 216 of gas bearing conduits 214 increase in size from first axial portion 218 of casing 210 to second axial portion 219 of casing 210. Thus, a first one of gas bearing conduits 214 may be positioned adjacent or at first axial portion 218 of casing 210, and a second one of gas bearing conduits 214 positioned adjacent or at second axial portion 219 of casing 210. An exit of the first one of gas bearing conduits 214 may be smaller than an exit of the second one of gas bearing conduits 214.

Piston 220 is slidably received within chamber 212 of casing 210. Thus, piston 220 may move, e.g., along the axial direction A, within chamber 212 of casing 210. Compressed refrigerant or any other suitable compressed fluid, such as air, may exit gas bearing conduits 214 and lubricate motion of piston 220 relative to casing 210 within chamber 212 of casing 210, as discussed in greater detail below. Having an increasing size of the exits 216 of gas bearing conduits 214 from first axial portion 218 of casing 210 to second axial portion 219 of casing 210 may assist with hindering or limiting leaking of compressed fluid into chamber 212 of casing 210, e.g., and thereby increase an efficiency of an associated compressor lubricated by gas bearing assembly 200.

Piston 220 defines a supply conduit 222 that permits a flow fluid into chamber 212 of casing 210. An intake/suction valve 224 is positioned at an outlet of supply conduit 222 and regulated fluid flow into chamber 212 of casing 210 via supply conduit 222. In particular, intake/suction valve 224 permits fluid flow into chamber 212 of casing 210 via supply conduit 222 during an expansion stroke of piston 220 and hinders or blocks fluid flow into chamber 212 of casing 210 via supply conduit 222 during a compression stroke of piston 220, as will be understood by those skilled in the art.

Gas bearing assembly 200 also includes a plurality of gas bearing control valves 230. Gas bearing control valves 230 are configured for regulating fluid flow through gas bearing conduits 214. Each gas bearing control valve of gas bearing control valves 230 are coupled to a respective one of gas bearing conduits 214. Each gas bearing control valve of gas bearing control valves 230 is configured for regulating fluid flow through the respective one of gas bearing conduits 214. In particular, each gas bearing control valve of gas bearing control valves 230 may permit fluid flow through the respective one of gas bearing conduits 214 when piston 220 is positioned adjacent exit 216 of the respective one of gas bearing conduits 214 in chamber 212 of casing 210. Conversely, each gas bearing control valve of gas bearing control valves 230 may hinder or obstruct fluid flow through the respective one of gas bearing conduits 214 when piston 220 is not positioned adjacent exit 216 of the respective one of gas bearing conduits 214 in chamber 212 of casing 210.

As an example, turning to FIG. 4, gas bearing control valves 230 coupled to gas bearing conduits 214 at second axial portion 219 of casing 210 may hinder the flow of compressed fluid through gas bearing conduits 214 at second axial portion 219 of casing 210 when piston 220 is at a top dead center position. Conversely, gas bearing control valves 230 coupled to gas bearing conduits 214 at first axial portion 218 of casing 210 may permit the flow of compressed fluid through gas bearing conduits 214 at first axial portion 218 of casing 210 when piston 220 is at the top dead center position. As another example, turning to FIG. 5, gas bearing control valves 230 coupled to gas bearing conduits 214 at first axial portion 218 of casing 210 may hinder the flow of compressed fluid through gas bearing conduits 214 at first axial portion 218 of casing 210 when piston 220 is at a bottom dead center position. Conversely, gas bearing control valves 230 coupled to gas bearing conduits 214 at second axial portion 219 of casing 210 may permit the flow of compressed fluid through gas bearing conduits 214 at second axial portion 219 of casing 210 when piston 220 is at the bottom dead center position. In such a manner, gas bearing control valves 230 may assist with regulating the flow of compressed fluid through gas bearing conduits 214 into a gap G between piston 220 and casing 210 in order to, e.g., always, lubricate motion of piston 220 relative to casing 210 within chamber 212 of casing 210. In addition, gas bearing control valves 230 may assist with limiting or preventing a flow of compressed fluid from gas bearing conduits 214 into chamber 212 of casing 210.

Gas bearing control valves 230 may be any suitable types of valves. For example, gas bearing control valves 230 may be solenoid valves or pressure actuated reed valves. Any suitable mechanism or method may be used to determine when piston 220 is or is not positioned adjacent exits 216 of gas bearing conduits 214 in chamber 212 of casing 210. For example, gas bearing control valves 230 may be operatively coupled to a Hall effect sensor, an optical sensor, a reed switch, etc. that determines a position of piston 220 in chamber 212 of casing 210, e.g., by actuating when piston 220 is positioned adjacent the exit 216 of an associated gas bearing conduits 214 in chamber 212 of casing 210. As another example, the position of piston 220 in chamber 212 of casing 210 may be estimated based at least in part upon various operating parameter of linear compressor 100 (e.g., current to driving coil 132, dynamics of piston assembly 120, gas forces within chamber 112 of casing 110, etc., as will be understood by those skilled in the art.

Gas bearing assembly 200 further includes at least one discharge valve 240 and a compressed fluid conduit 242. Discharge valve 240 is positioned at an end of chamber 212 of casing 210. Thus, discharge valve 240 is disposed between chamber 212 of casing 210 and a downstream compressed fluid volume 244. During operation of an associated compressor, motion of piston 220 within chamber 212 of casing 210 increases a pressure of fluid within chamber 212 of casing 210 and the compressed fluid may flow through compression valve 240 into the downstream compressed fluid volume 244. Thus, compression valve 240 is configured for regulating a flow of compressed fluid from chamber 212 of casing 210 to downstream compressed fluid volume 244. Compressed fluid conduit 242 extends between downstream compressed fluid volume 244 and gas bearing conduits 214. Thus, compressed fluid may flow from downstream compressed fluid volume 244 to gas bearing conduits 214 via compressed fluid conduit 242.

An accumulator 246 is coupled to compressed fluid conduit 242. Accumulator 246 defines a reservoir 248. Reservoir 248 of accumulator 246 is positioned and configured for receiving compressed fluid from downstream compressed fluid volume 244. Compressed fluid within reservoir 248 of accumulator 246 may provide a supply of compressed fluid for lubricating piston 220. Compressed fluid within reservoir 248 of accumulator 246 may also reject heat. Accumulator 246 may also assist with dampening any oscillations in pressure due to pumping action of linear compressor 100 and provides for a constant supply of compressed fluid to gas bearing conduits 214. A check valve 249 is coupled to compressed fluid conduit 242 between downstream compressed fluid volume 244 and accumulator 246. Check valve 249 hinders or prevents compressed fluid flow from locations past check valve 249 back towards downstream compressed fluid volume 244.

Figure 6:
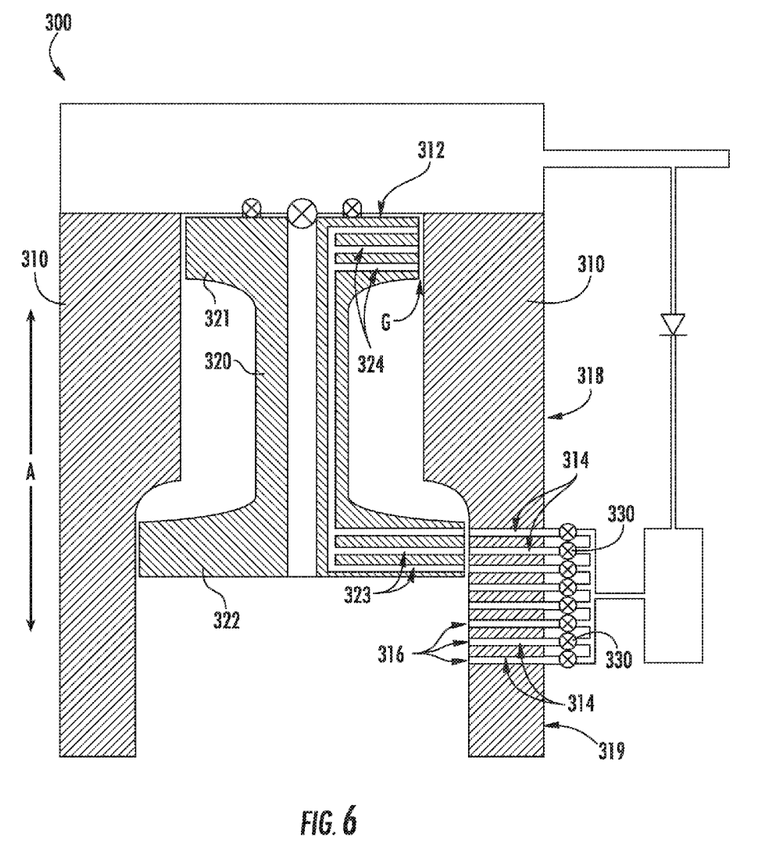
FIGS. 6 and 7 provide schematic views of a gas bearing assembly according to another exemplary embodiment of the present subject matter with a piston shown in various positions.
Figure 7:
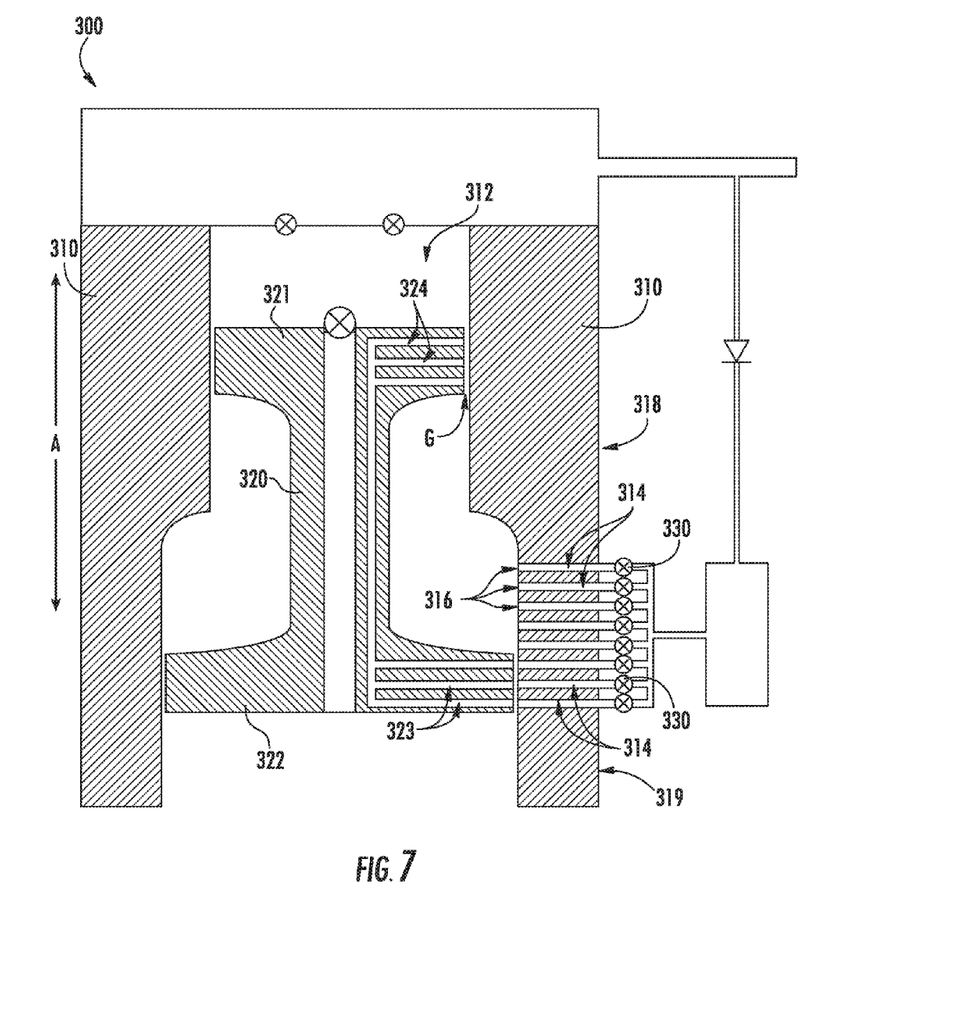

FIGS. 6 and 7 provide schematic views of a gas bearing assembly 300 according to an exemplary embodiment of the present subject matter with a piston 320 shown in various positions. Gas bearing assembly 300 may be constructed in a similar manner to gas bearing assembly 200 (FIG. 4). Thus, gas bearing assembly 300 includes similar features and functions in a similar manner to gas bearing assembly 200. Like gas bearing assembly 200, gas bearing assembly 300 may be used in any suitable compressor.

As may be seen in FIGS. 6 and 7, gas bearing assembly 300 includes a casing 310. Casing 310 defining a chamber 312 that extends along the axial direction A. Casing 310 also defines a plurality of gas bearing conduits 314. Each gas bearing conduit of gas bearing conduits 314 has an exit 316 that is positioned at chamber 312 of casing 310. Exits 316 of gas bearing conduits 314 are distributed or dispersed, e.g., linearly, along the axial direction A. While not shown in FIGS. 6 and 7, gas bearing conduits 314 may also extend circumferentially about chamber 312 of casing 310.

Gas bearing assembly 300 also includes a piston 320. Piston 320 includes a piston head 321 and a piston base 322, e.g., positioned opposite each other on piston 320. Piston head 321 is slidably received within chamber 312 of casing 310. Piston head 321 defines a plurality of gas bearing outlets 324, and piston base 322 defines a plurality of gas bearing inlets 323. Gas bearing outlets 324 are distributed or dispersed, e.g., linearly, along the axial direction A. While not shown in FIGS. 6 and 7, gas bearing outlets 324 may also extend circumferentially about piston head 321. A channel 325 within piston 320 extends between gas bearing inlets 323 and gas bearing outlets 324 in order to fluidly connect gas bearing inlets 323 and gas bearing outlets 324. Thus, compressed fluid may flow from gas bearing inlets 323 to gas bearing outlets 324 via channel 325 within piston 320. Gas bearing inlets 323 receive compressed fluid from gas bearing conduits 314, e.g., as discussed in greater detail below.

Gas bearing assembly 300 further includes a plurality of gas bearing control valves 330. Gas bearing control valves 330 are configured for regulating fluid flow through gas bearing conduits 314. Each gas bearing control valve of gas bearing control valves 330 are coupled to a respective one of gas bearing conduits 314. Each gas bearing control valve of gas bearing control valves 330 is configured for regulating fluid flow through the respective one of gas bearing conduits 314. In particular, each gas bearing control valve of gas bearing control valves 330 may permit fluid flow through the respective one of gas bearing conduits 314 when piston base 322 is positioned adjacent exit 316 of the respective one of gas bearing conduits 314 in chamber 312 of casing 310. Conversely, each gas bearing control valve of gas bearing control valves 330 may hinder or obstruct fluid flow through the respective one of gas bearing conduits 314 when piston base 322 is not positioned adjacent exit 316 of the respective one of gas bearing conduits 314 in chamber 312 of casing 310.

As an example, turning to FIG. 6, gas bearing control valves 330 coupled to gas bearing conduits 314 at a second axial portion 319 of casing 310 may hinder the flow of compressed fluid through gas bearing conduits 314 at second axial portion 319 of casing 310 when piston head 321 is at a top dead center position. Conversely, gas bearing control valves 330 coupled to gas bearing conduits 314 at a first axial portion 318 of casing 310 may permit the flow of compressed fluid through gas bearing conduits 314 at first axial portion 318 of casing 310 when piston 320 is at the top dead center position. As another example, turning to FIG. 7, gas bearing control valves 330 coupled to gas bearing conduits 314 at first axial portion 318 of casing 310 may hinder the flow of compressed fluid through gas bearing conduits 314 at first axial portion 318 of casing 310 when piston head 321 is at a bottom dead center position. Conversely, gas bearing control valves 330 coupled to gas bearing conduits 314 at second axial portion 319 of casing 310 may permit the flow of compressed fluid through gas bearing conduits 314 at second axial portion 319 of casing 310 when piston head 321 is at the bottom dead center position. In such a manner, gas bearing control valves 330 may assist with regulating the flow of compressed fluid through gas bearing conduits 314 into a gap G between piston head 321 and casing 310 in order to lubricate motion of piston head 321 relative to casing 310 within chamber 312 of casing 310. In addition, gas bearing control valves 330 may assist with limiting or preventing a flow of compressed fluid from gas bearing conduits 314 when exit 316 of the respective one of gas bearing conduits 314 is not aligned with one of gas bearing inlets 323 of piston base 322.

Figure 8:
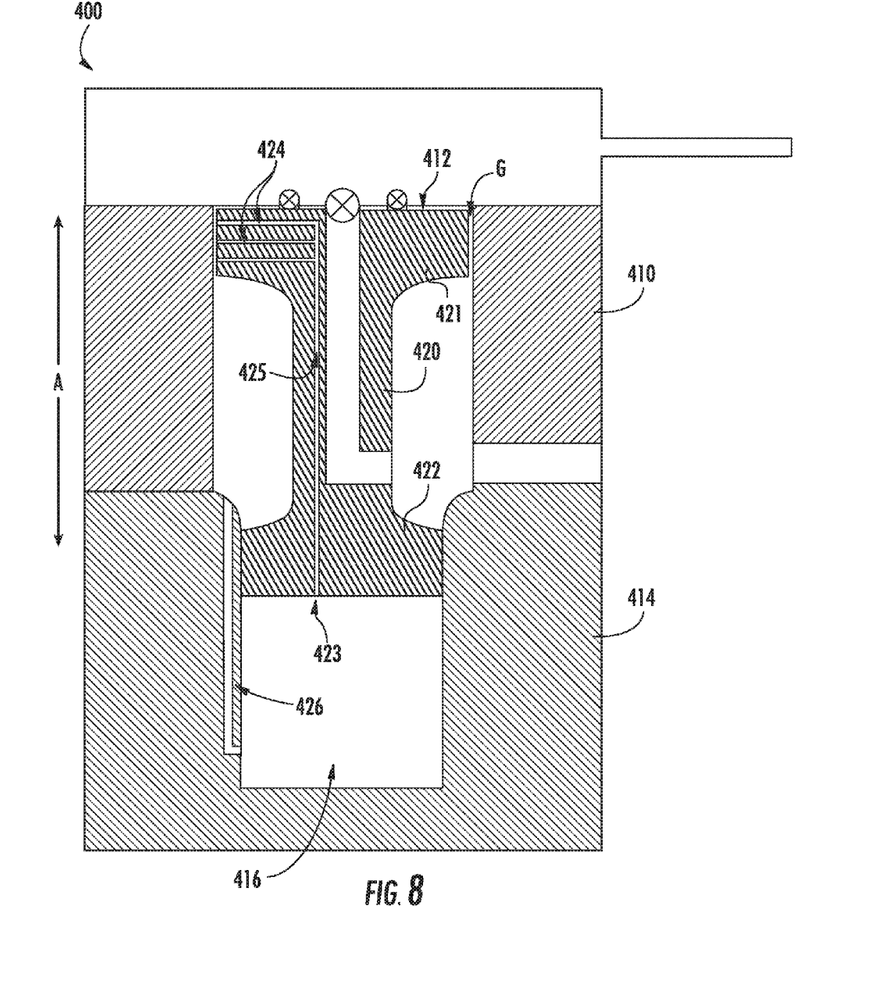
FIGS. 8 and 9 provide schematic views of a gas bearing assembly according to an additional exemplary embodiment of the present subject matter with a piston shown in various positions.
Figure 9:
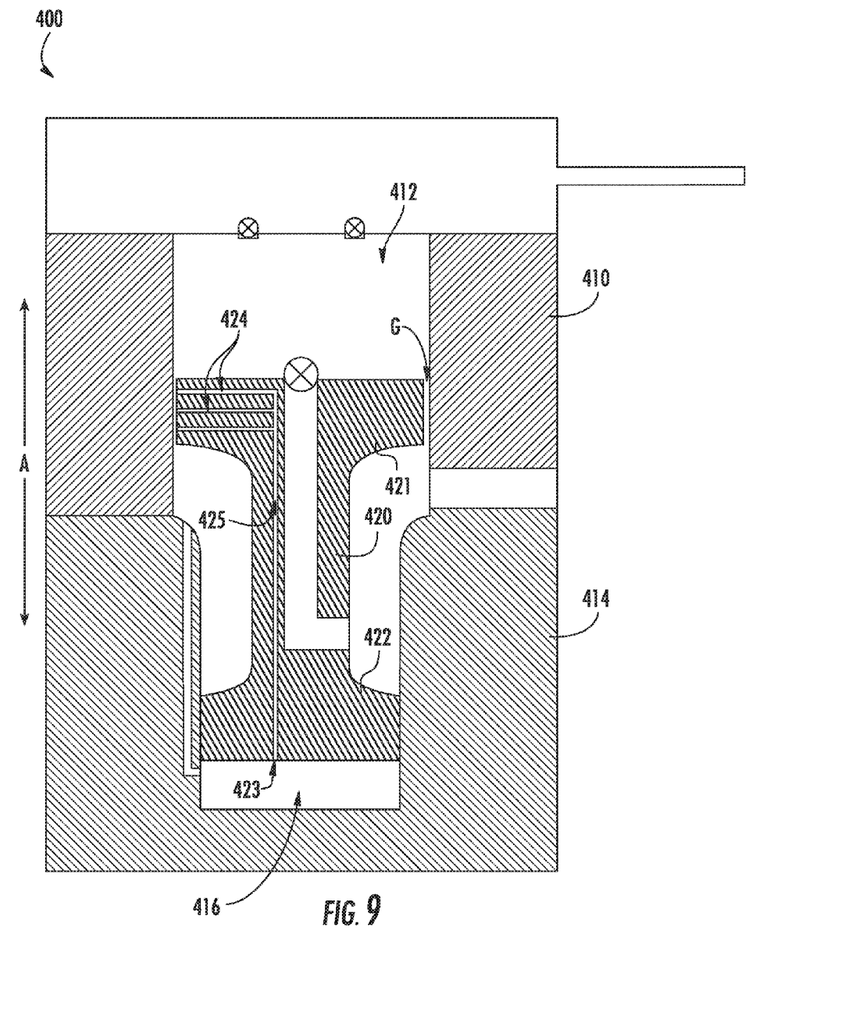

FIGS. 8 and 9 provide schematic views of a gas bearing assembly 400 according to an exemplary embodiment of the present subject matter with a piston 420 shown in various positions. Gas bearing assembly 400 may be constructed in a similar manner to gas bearing assembly 200 (FIG. 4). Thus, gas bearing assembly 400 includes similar features and functions in a similar manner to gas bearing assembly 200. Like gas bearing assembly 200, gas bearing assembly 400 may be used in any suitable compressor.

As may be seen in FIGS. 8 and 9, gas bearing assembly 400 includes a casing 410. Casing 410 defining a chamber 412 that extends along the axial direction A. Gas bearing assembly 400 also includes a secondary casing 414. Secondary casing 414 defines a secondary chamber 416 that extends along the axial direction A. Secondary chamber 416 of secondary casing 414 may be positioned opposite chamber 412 of casing 410 about piston 420.

Piston 420 includes a piston head 421 and piston base 422, e.g., positioned opposite each other on piston 420. Piston head 421 is slidably received within chamber 412 of casing 410, and piston base 422 is slidably received within secondary chamber 416 of secondary casing 414. Piston head 421 defines a plurality of gas bearing outlets 424, and piston base 422 defines a gas bearing inlet 423. Gas bearing outlets 424 are distributed or dispersed, e.g., linearly, along the axial direction A. While not shown in FIGS. 8 and 9, gas bearing outlets 424 may also extend circumferentially about piston head 421. A channel 425 within piston 420 extends between gas bearing inlet 423 and gas bearing outlets 424 in order to fluidly connect gas bearing inlet 423 and gas bearing outlets 424. Thus, compressed fluid may flow from gas bearing inlet 423 to gas bearing outlets 424 via channel 425 within piston 420. Gas bearing inlet 423 of piston base 422 is positioned at secondary chamber 416 of secondary casing 414.

As an example, piston base 422 may compress fluid within secondary chamber 416 of secondary casing 414. The compressed fluid within secondary chamber 416 of secondary casing 414 may flow from gas bearing inlet 423 to gas bearing outlets 424 via channel 425 within piston 420. In such a manner, compressed fluid from secondary chamber 416 of secondary casing 414 may flow into a gap G between piston head 421 and casing 410 in order to lubricate motion of piston head 421 relative to casing 410 within chamber 412 of casing 410. From gap G, the fluid may flow back to secondary chamber 416 of secondary casing 414 via a return conduit 426, e.g., defined by casing 410.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A compressor defining an axial direction, the compressor comprising:
    a casing defining a chamber that extends along the axial direction, the casing also defining a plurality of gas bearing conduits, each gas bearing conduit of the plurality of gas bearing conduits having an exit, the exits of the plurality of gas bearing conduits distributed along the axial direction;
    a piston having a piston head slidably received within the chamber of the casing, the piston also having a piston base, the piston head defining a plurality of gas bearing outlets and the piston base defining a plurality of gas bearing inlets;
    a motor configured for selectively reciprocating the piston head along the axial direction within the chamber of the casing;
    a plurality of gas bearing control valves configured for regulating fluid flow through the plurality of gas bearing conduits, each gas bearing control valve of the plurality of gas bearing control valves coupled to a respective one of the plurality of gas bearing conduits, each gas bearing control valve of the plurality of gas bearing control valves configured for permitting fluid flow through the respective one of the plurality of gas bearing conduits when one of the plurality of gas bearing inlets of the piston base is positioned adjacent the exit of the respective one of the plurality of gas bearing conduits;
    a valve positioned at an end of the chamber such that the valve is disposed between the chamber of the casing and a downstream compressed fluid volume, the valve configured for regulating a flow of compressed fluid from the chamber of the casing to the downstream compressed fluid volume; and
    a compressed fluid conduit extending between the downstream compressed fluid volume and the plurality of gas bearing conduits.

2. The compressor of claim 1, wherein the plurality of gas bearing control valves comprise solenoid valves or pressure actuated reed valves.

3. The compressor of claim 1, further comprising an accumulator coupled to the compressed fluid conduit, the accumulator defining a reservoir for receiving compressed fluid from the downstream compressed fluid volume.

4. The compressor of claim 3, further comprising a check valve coupled to the compressed fluid conduit between the downstream compressed fluid volume and the accumulator.

5. The compressor of claim 1, wherein the piston head extends between a first axial portion and a second axial portion along the axial direction, the gas bearing outlets of the plurality of gas bearing outlets increasing in size from the first axial portion of the piston head to the second axial portion of the piston head.

6. The compressor of claim 1, wherein the piston head extends between a first axial portion and a second axial portion, a first one of the plurality of gas bearing outlets positioned adjacent the first axial portion of the piston head and a second one of the plurality of gas bearing outlets positioned adjacent the second axial portion of the piston head, the first one of the plurality of gas bearing outlets being smaller than the second one of the plurality of gas bearing outlets.

7. The compressor of claim 1, wherein each gas bearing control valve of the plurality of gas bearing control valves is further configured for blocking fluid flow through the respective one of the plurality of gas bearing conduits when one of the plurality of gas bearing inlets of the piston base is not positioned adjacent the exit of the respective one of the plurality of gas bearing conduits.

8. The compressor of claim 7, further comprising a piston location sensor configured for determining a position of the plurality of gas bearing inlets of the piston base relative to the plurality of gas bearing conduits.

\* \* \* \* \*